(12) United States Patent  
Davis et al.

(10) Patent No.: US 11,414,592 B2
(45) Date of Patent: Aug. 16, 2022

(54) METHODS AND COMPOSITIONS FOR REDUCING CORROSIVITY OF AQUEOUS FLUIDS

(71) Applicant: Halliburton Energy Services, Inc., Houston, TX (US)

(72) Inventors: Nathan Darrell Davis, Conroe, TX (US); Philippe Prince, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 21 days.

(21) Appl. No.: 16/782,570

(22) Filed: Feb. 5, 2020

(65) Prior Publication Data

US 2020/0347286 A1 Nov. 5, 2020

Related U.S. Application Data

(60) Provisional application No. 62/843,070, filed on May 3, 2019.

(51) Int. Cl.
*E21B 41/02* (2006.01)
*C09K 8/68* (2006.01)
*E21B 43/26* (2006.01)
*C09K 8/54* (2006.01)

(52) U.S. Cl.
CPC .................. *C09K 8/68* (2013.01); *C09K 8/54* (2013.01); *E21B 41/02* (2013.01); *E21B 43/26* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 3,199,591 A | 8/1965 | Kepley | |
| 3,531,409 A | 9/1970 | Seffens et al. | |
| 4,238,349 A * | 12/1980 | Larsen | C10G 75/02 252/392 |
| 6,402,984 B1 | 6/2002 | Nakajima et al. | |
| 6,828,280 B2 | 12/2004 | England et al. | |
| 7,093,663 B1 | 8/2006 | Bader | |
| 7,268,100 B2 | 9/2007 | Kippie et al. | |
| 7,493,955 B2 | 2/2009 | Gupta et al. | |
| 2004/0084186 A1 | 5/2004 | Allison | |

(Continued)

OTHER PUBLICATIONS

International Search Report and Written Opinion issued in related PCT Application No. PCT/US2020/017025, dated Jun. 8, 2020, 10 pages.

(Continued)

*Primary Examiner* — Andrew Sue-Ako
(74) *Attorney, Agent, or Firm* — Conley Rose, P.C.; Rodney B. Carroll

(57) ABSTRACT

Methods and compositions for treating aqueous fluids that may be included in treatment fluids that are used for treating a subterranean formation. In some embodiments, the methods include: providing a treatment fluid including an aqueous fluid and a composition that includes an oxygen scavenger, a pH-adjusting agent, and a corrosion inhibitor, wherein the aqueous fluid is aerated; contacting a metal surface with the treatment fluid; and introducing the treatment fluid into a wellbore penetrating at least a portion of a subterranean formation.

16 Claims, 3 Drawing Sheets

(56) References Cited

U.S. PATENT DOCUMENTS

| | | |
|---|---|---|
| 2006/0260813 A1 | 11/2006 | Welton et al. |
| 2008/0058576 A1* | 3/2008 | Shafer .................. C09K 8/68 |
| | | 588/300 |
| 2008/0070813 A1* | 3/2008 | Lin ..................... C09K 8/602 |
| | | 507/269 |
| 2012/0157356 A1 | 6/2012 | Dawson et al. |
| 2012/0225800 A1 | 9/2012 | Hendrickson |
| 2012/0295820 A1* | 11/2012 | Falana .................. C09K 8/68 |
| | | 507/128 |
| 2013/0035265 A1 | 2/2013 | Daccord |
| 2013/0261032 A1 | 10/2013 | Ladva et al. |
| 2015/0005216 A1 | 1/2015 | De Wolf et al. |
| 2015/0114638 A1 | 4/2015 | Taylor |
| 2015/0197686 A1 | 7/2015 | Mason |
| 2019/0055445 A1 | 2/2019 | Kulkarni et al. |

OTHER PUBLICATIONS

International Preliminary Report on Patentability issued in related PCT Application No. PCT/US2020/017025 dated Nov. 18, 2021, 7 pages.

* cited by examiner

METHODS AND COMPOSITIONS FOR REDUCING CORROSIVITY OF AQUEOUS FLUIDS

CROSS-REFERENCE TO RELATED APPLICATION

The present application claims priority to U.S. Provisional Application Ser. No. 62/843,070 filed on May 3, 2019.

BACKGROUND

The present disclosure relates to compositions for treating a subterranean formation and methods of preparing the same.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations may include, for example, fracturing operations, gravel packing operations, acidizing operations, scale dissolution and removal, consolidation operations, and the like. For example, a fluid may be used to drill a wellbore in a subterranean formation or to complete a wellbore in a subterranean formation, as well as numerous other purposes.

The corrosion of metal surfaces occurs when the metal surfaces are contacted by a corrosive environment containing an oxidizer (e.g., an electrochemical oxidizer, a chemical oxidizer or the like). As used herein, the term "corrosion" refers to any reaction between a material and its environment that causes some deterioration of the material or its properties. Examples of common types of corrosion include, but are not limited to, the rusting of a metal, the dissolution of a metal in acids, and patina development on the surface of a metal. One example of a corrosive environment is an aqueous fluid in the presence of air and/or oxygen.

BRIEF DESCRIPTION OF THE DRAWINGS

These drawings illustrate certain aspects of some of the embodiments of the present disclosure and should not be used to limit or define the claims.

Figure 1:
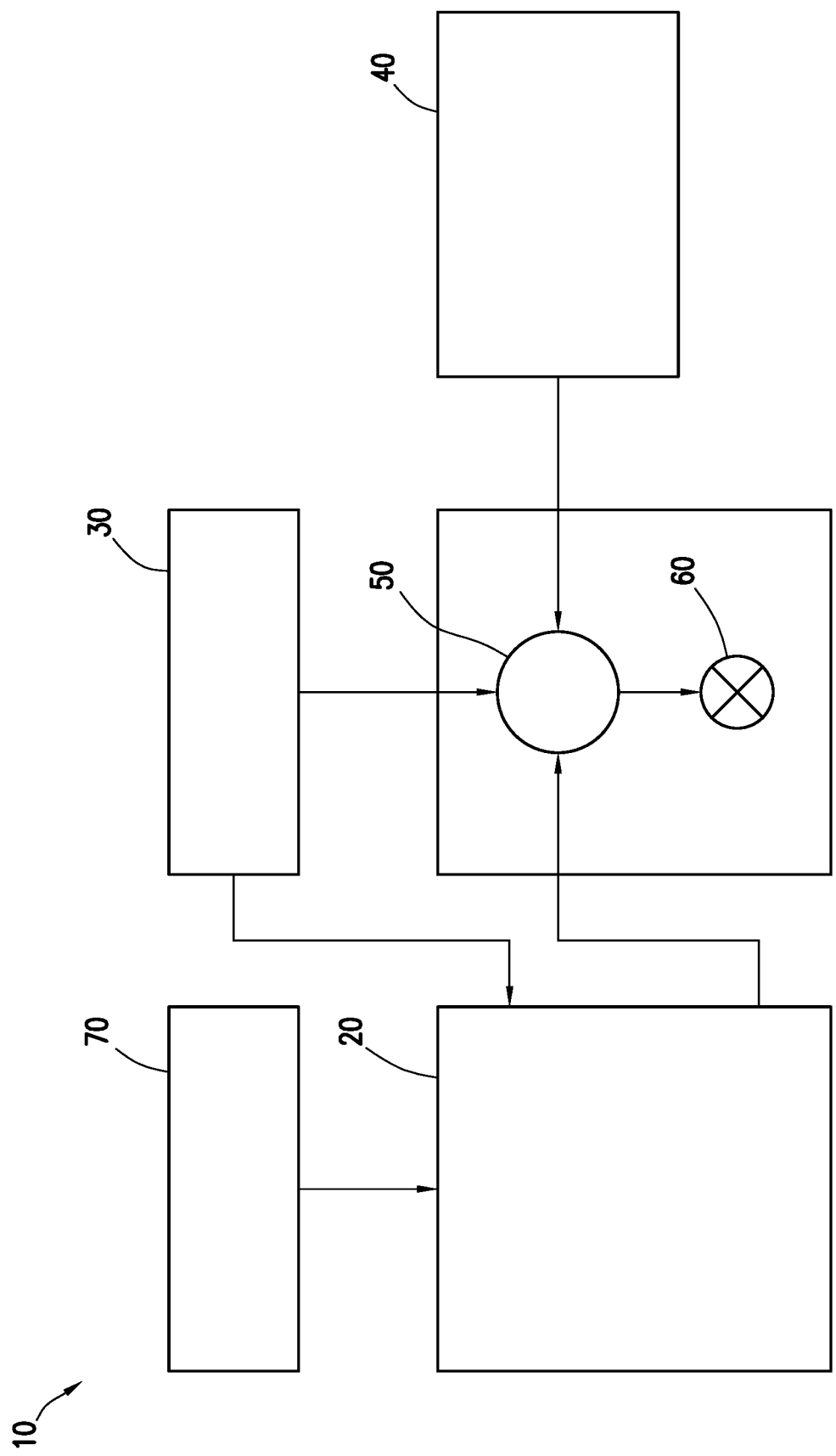
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions for treating a subterranean formation and methods for preparing the same. More particularly, the present disclosure relates to methods and compositions for treating aqueous fluids that are used for treating a subterranean formation.

The present disclosure provides a composition including an oxygen scavenger, a pH-adjusting agent, and a corrosion inhibitor. The present disclosure also provides methods that include adding a composition including an oxygen scavenger, a pH-adjusting agent, and a corrosion inhibitor to an aqueous fluid. The methods of the present disclosure may also include adding one or more additives to the aqueous fluid to form a treatment fluid. In some embodiments, the methods may further include adding one or more additives to the aqueous fluid to form a fracturing fluid. In some embodiments, the methods may further include allowing the composition to increase the pH of the aqueous fluid. In some embodiments, the methods may further include allowing the composition to reduce the amount of oxygen in the aqueous fluid. In some embodiments, the methods may further include allowing the composition to reduce the corrosivity of the aqueous fluid.

Among the many potential advantages to the methods and compositions of the present disclosure, only some of which are alluded to herein, the methods and compositions of the present disclosure may provide for reduced corrosivity of aqueous treatment fluids, which in some embodiments, may do so without interfering with other chemicals in the aqueous fluid. In some embodiments, the methods and compositions of the present disclosure may, in turn, reduce the corrosion and/or failure rates of equipment that are contacted with the aqueous treatment fluids.

In certain embodiments, the compositions of the present disclosure include an oxygen scavenger, a pH-adjusting agent, and a corrosion inhibitor. The oxygen scavengers used in the compositions of the present disclosure may be any chemical that reduces the amount of oxygen in an aqueous fluid. In certain embodiments, the oxygen scavenger may include sodium sulfite, ammonium bisulfite, sodium bisulfite, sodium metabisulfite, diethylhydroxyl amine, sodium erythorbate, potassium sulfite, hydroquinone, methylethyl ketoxime, catalyzed or non-catalyzed, and any combination thereof. In certain embodiments, the composition may include the oxygen scavenger in an amount from about 1% to about 90% by weight of the composition. In other embodiments, the composition may include the oxygen scavenger in an amount from about 5% to about 70% by weight of the composition. In yet other embodiments, the composition may include the oxygen scavenger in an amount from about 10% to about 40% by weight of the composition.

The pH-adjusting agents used in the compositions of the present disclosure may be any chemical that increases the pH of an aqueous fluid. In certain embodiments, the pH-adjusting agent may include sodium hydroxide, potassium hydroxide, ammonium hydroxide, sodium hypochlorite, ethanolamine, diethanolamine, triethanolamine, any water soluble primary, secondary or tertiary amine, and any combination thereof. In certain embodiments, the composition may include the pH-adjusting agent in an amount from about 0.5% to about 50% by weight of the composition. In other embodiments, the composition may include the pH-adjusting agent in an amount from about 1% to about 30% by weight of the composition. In yet other embodiments, the composition may include the pH-adjusting agent in an amount from about 1% to 10% by weight of the composition.

The corrosion inhibitors used in the compositions of the present disclosure may be any surfactant that is capable of inhibiting corrosion of metal surfaces (e.g., a film forming corrosion inhibitor). In certain embodiments, the corrosion inhibitor may include a hydrophilic moiety, and the hydrophilic moiety may include a quaternary amine, imine, amide, imidazoline, pyridine, carboxylic acid, phosphate ester, thiol group, or any salt of any of the foregoing. In certain embodiments, the hydrophilic moiety may be attached to one or more hydrocarbon chains having hydrophobic properties. Each hydrocarbon chain may independently include from about 8 to about 22 carbons and may be linear or branched, cyclic or acyclic, and/or saturated or unsaturated. Each hydrocarbon chain may be independently substituted with a functional group including one or more of: ether, ester, hydroxyl, alkane, alkene, alkyne and any combination thereof. In certain embodiments, the corrosion inhibitor may be a film forming corrosion inhibitor. In certain embodiments, the composition may include the corrosion inhibitor in an amount from about 0.5% to about 70% by weight of the composition. In other embodiments, the composition may include the corrosion inhibitor in an amount from about 0.5% to about 40% by weight of the composition. In yet other embodiments, the composition may include the corrosion inhibitor in an amount from about 0.1% to about 20% by weight of the composition.

In certain embodiments, the methods of the present disclosure may include adding a composition including an oxygen scavenger, a pH-adjusting agent, and a corrosion inhibitor to an aqueous fluid. The aqueous fluid may include any aqueous fluid known in the art. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, produced water, surface water (e.g., from a river or a pond), reclaimed water, or any combination thereof. In most embodiments of the present disclosure, the aqueous fluids include one or more ionic species, such as those formed by salts dissolved in water. For example, seawater and/or produced water may include a variety of cationic species dissolved therein. In certain embodiments, the aqueous phase may be a salt water or brine. In such embodiments, the salt may be any suitable salt, such as at least one of NaBr, KBr, $CaCl_2$, $CaBr_2$, $ZnBr_2$, KCl, NaCl, $MgCl_2$, $SrCl_2$, $BaCl_2$, $NaHCO_3$, $NaSO_4$, a carbonate salt, sulfide salts, a phosphate salt, a magnesium salt, a bromide salt, a formate salt, and an acetate salt. In certain embodiments, the aqueous fluid may include produced water from a subterranean formation.

In certain embodiments, the aqueous fluid may be aerated with one or more gases (e.g., air or oxygen). This depiction of an aerated fluid is not exhaustive since the aerated fluid may be any aqueous fluid that has been exposed to any gas in any way, such as placing the fluid in the presence of the gas, contacting the aqueous fluid with the gas, passing the gas through the aqueous fluid (e.g., injecting), or contacting the aqueous fluid with another aqueous fluid containing the gas. In certain embodiments, the gas may be present in the aqueous fluid in an amount from about 4 parts per million ("ppm") to about 14 ppm by volume of the aqueous fluid. In other embodiments, the gas may be present in the aqueous fluid in an amount from about 6 ppm to about 14 ppm by volume of the aqueous fluid. In yet other embodiments, the gas may be present in the aqueous fluid in an amount from about 8 ppm to about 14 ppm by volume of the aqueous fluid. In yet other embodiments, the gas may be present in the aqueous fluid in an amount from about 10 ppm to about 14 ppm by volume of the aqueous fluid.

In certain embodiments, the composition that includes an oxygen scavenger, a pH-adjusting agent, and a corrosion inhibitor may be added to the aqueous fluid in an amount from about 50 ppm to about 5,000 ppm by volume of the aqueous fluid. In other embodiments, the composition may be added to the aqueous fluid in an amount from about 50 ppm to about 2,500 ppm by volume of the aqueous fluid. In yet other embodiments, the composition may be added to the aqueous fluid in an amount from about 50 ppm to about 1,500 ppm by volume of the aqueous fluid. In yet other embodiments, the composition may be added to the aqueous fluid in an amount from about 200 ppm to about 1,500 ppm by volume of the aqueous fluid.

In some embodiments, the methods of the present disclosure include allowing the pH-adjusting agent to increase the pH of the aqueous fluid. In certain embodiments, the aqueous fluids may have an initial pH in a range from about 6.0 to about 8.0. In certain embodiments, the pH-adjusting agent may increase the pH of the aqueous fluid to a range from about 7.0 to about 9.0. In other embodiments, the pH-adjusting agent may increase the pH of the aqueous fluid to a range from about 7.5 to about 8.5. In other embodiments, the pH-adjusting agent may increase the pH of the aqueous fluid to a range from about 8.0 to about 8.5. In some embodiments, the methods of the present disclosure include allowing the oxygen scavenger to reduce the amount of oxygen in the aqueous fluid. In some embodiments, the methods of the present disclosure include allowing the corrosion inhibitor to reduce the corrosivity of the aqueous fluid.

In certain embodiments, one or more of the oxygen scavenger, the pH-adjusting agent, and the corrosion inhibitor may be combined together before being added to the aqueous fluid. In such embodiments, compositions including one or more of those components may be stored (e.g., in a tank or vessel) for a period of time before being added to the aqueous fluid. In certain embodiments, such compositions may be stored for up to 12 months before being added to the aqueous fluid. In other embodiments, one or more of the oxygen scavenger, the pH-adjusting agent, and the corrosion inhibitor may be added separately to the aqueous fluid. In such embodiments, the oxygen scavenger, the pH-adjusting agent, and the corrosion inhibitor may collectively constitute a composition as used herein even when separately added to the aqueous fluid. In certain embodiments, the compositions of the present disclosure (or one or more components thereof) may be directly metered into an aqueous fluid. In certain embodiments, the composition (or one or more components thereof) may be added to the aqueous fluid by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the composition (or one or more components thereof) may be pulsed into the aqueous fluid. In certain embodiments, the composition (or one or more components thereof) may be injected into a pipeline upstream of a tank or other suitable vessel containing the aqueous fluid. In other embodiments, the composition (or one or more components thereof) may be directly added to the tank or other suitable vessel containing the aqueous fluid.

In certain embodiments, the methods of the present disclosure may include forming a treatment fluid by adding one or more additives to an aqueous fluid including a composition of the present disclosure. In certain embodiments, the one or more additives may be added to the aqueous fluid after the composition has been added to the aqueous fluid. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

In certain embodiments, the treatment fluids of the present disclose may include one or more proppant particulates. Examples of materials that may be suitable for use as proppant particulates in certain embodiments of the present disclosure include, but are not limited to, fly ash, silica, alumina, fumed carbon (e.g., pyrogenic carbon), carbon black, graphite, mica, titanium dioxide, metal-silicate, silicate, kaolin, talc, zirconia, boron, hollow microspheres (e.g., spherical shell-type materials having an interior cavity), glass, sand, bauxite, sintered bauxite, ceramic, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. The proppant particulates may be of any shape (regular or irregular) suitable or desired for a particular application. In some embodiments, the proppant particulates may be round or spherical in shape, although they may also take on other shapes such as ovals, capsules, rods, toroids, cylinders, cubes, or variations thereof. In certain embodiments, the proppant particulates of the present disclosure may be relatively flexible or deformable, which may allow them to enter certain perforations, microfractures, or other spaces within a subterranean formation whereas solid particulates of a similar diameter or size may be unable to do so.

In certain embodiments, the treatment fluid may include proppant particulates in an amount from about 0.05 to about 12 pounds of particulates per gallon of treatment fluid ("ppg"). In other embodiments, the treatment fluid may include the proppant particulates in an amount from about 3 ppg to about 10 ppg. In other embodiments, the treatment fluid may include the proppant particulates in an amount from about 0.1 ppg to about 0.5 ppg, in other embodiments, about 0.5 ppg to about 1.0 ppg, in other embodiments, about 1.0 ppg to about 2.0 ppg, in other embodiments, about 2.0 ppg to about 3.0 ppg, in other embodiments, about 3.0 ppg to about 4.0 ppg, in other embodiments, about 4.0 ppg to about 5.0 ppg, in other embodiments, about 5.0 ppg to about 6.0 ppg, in other embodiments, about 6.0 ppg to about 7.0 ppg, in other embodiments, about 7.0 ppg to about 8.0 ppg, in other embodiments, about 8.0 ppg to about 9.0 ppg, and in other embodiments, about 9.0 ppg to about 10 ppg.

In certain embodiments, the treatment fluids used in the methods of the present disclosure may include a friction reducer. Examples of suitable friction reducers include, but are not limited to, polyacrylates, polyacrylate derivatives, polyacrylate co-polymers, polymethacrylates, polymethacrylate derivatives, polymethacrylate co-polymers, polyacrylamide, polyacrylamide derivatives, polyacrylamide co-polymers, and any combination thereof. Those of ordinary skill in the art will appreciate that the friction reducing polymer included in the treatment fluid should have a molecular weight sufficient to provide a desired level of friction reduction. In certain embodiments, the treatment fluid may include the friction reducer in an amount from about 0.05 to about 1.5 gallons per thousand gallons ("gpt") of the treatment fluid. In other embodiments, the treatment fluid may include the friction reducer in an amount from about 0.1 to about 1.0 gpt of the treatment fluid. In other embodiments, the treatment fluid may include the friction reducer in an amount from about 0.2 to about 0.6 gpt of the treatment fluid.

In certain embodiments, the treatment fluids used in the methods of the present disclosure may include a biocide. Examples of suitable biocides include, but are not limited to, quaternary amines, glutaraldehyde, THPS, acrolein, bromo-sulfamic acid, 2,2-dibromo-3-nitrilopropionamide, hypochlorite bleach, cyanuric acids (e.g., trichloroisocyanuric acid), halogenated salts (e.g., lithium hypochlorite, peroxide-based compounds), and the like, and any combination thereof. In certain embodiments, the biocide may be present in the treatment fluid in an amount from about 0.01 to about 10 gpt of the treatment fluid. In other embodiments, the biocide may be present in the treatment fluid in an amount from about 0.1 to about 0.5 gpt of the treatment fluid.

In certain embodiments, the treatment fluids used in the methods of the present disclosure may include a scale inhibitor. Examples of suitable scale inhibitors include, but are not limited to, polyphosphates, phosphate esters, phosphonates, polyacrylic acid and salts thereof, other carboxylic acid containing polymers, and any combination thereof. In certain embodiments, the scale inhibitor may be present in the treatment fluid in an amount from about 0.01 to about 1 gpt of the treatment fluid. In other embodiments, the scale inhibitor may be present in the treatment fluid in an amount from about 0.01 to about 0.5 gpt of the treatment fluid.

In certain embodiments, the treatment fluids used in the methods of the present disclosure may include one or more surfactants. Surfactants that may be suitable for use in certain embodiments of the present disclosure include cationic, anionic, zwitterionic, and nonionic surfactants. Examples of cationic surfactants that may be suitable for use in certain embodiments of the present disclosure include, but are not limited to, alkyl amines, alkyl amine salts, quaternary ammonium salts such as trimethyltallowammonium halides (e.g., trimethyltallowammonium chloride, trimethyltallowammonium bromide), amine oxides, alkyltrimethyl amines, triethyl amines, alkyldimethylbenzylamines, cetyltrimethylammonium bromide, alkyl dimethyl benzylammonium chloride, trimethylcocoammonium chloride, derivatives thereof, and combinations thereof. Examples of anionic surfactants that may be suitable for use in certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, $C_8$ to $C_{22}$ alkylethoxylate sulfate, alkylphenol ethoxylate sulfate (or salts thereof), monoalkylphosphates, polyalkylphosphates, fatty acids, alkali salts of fatty acids, glyceride sulfates, sodium salts of fatty acids, soaps, derivatives thereof, and combinations thereof. Examples of amphoteric or zwitterionic surfactants that may be suitable for use in certain embodiments of the present disclosure include, but are not limited to, dihydroxyl alkyl glycinate, alkyl ampho acetate or propionate, alkyl betaine, alkyl amidopropyl betaine and alkylimino mono- or di-propionates derived from certain waxes, fats and oils. Examples of nonionic surfactants that may be suitable for use in certain embodiments of the present disclosure include, but are not limited to, alcohol oxylalkylates, alkyl phenol oxylalkylates, nonionic esters such as sorbitan esters, alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylate, derivatives thereof, and any combination thereof. A person of skill in the art with the benefit of the present disclosure will understand how to select such surfactants that may be suitable for a particular application of the methods and compositions of the present disclosure.

In certain embodiments, the surfactant may be present in the treatment fluid in an amount up to about 2.0% by volume of the treatment fluid. In other embodiments, the surfactant may be present in the treatment fluid in an amount from about 0.01% to about 2.0% by volume of the treatment fluid. In other embodiments, the surfactant may be present in the treatment fluid in an amount from about 0.2% to about 1.5% by volume of the treatment fluid. In other embodiments, the surfactant may be present in the treatment fluid in an amount from about 0.5% to about 1.0% by volume of the treatment fluid.

The treatment fluids of the present disclosure may be introduced into a portion of a subterranean formation. The treatment fluid may be, for example, a stimulation fluid or a hydraulic fracturing fluid. In introducing a treatment fluid of the present disclosure into a portion of a subterranean formation, the components of the treatment fluid may be mixed together at the surface (or offsite prior to transport to the wellsite) and introduced into the formation together, or one or more components may be separately introduced into the formation at the surface from other components such that the components mix or intermingle in a portion of the formation to form a treatment fluid. In either such case, the treatment fluid is deemed to be introduced into at least a portion of the subterranean formation for purposes of the present disclosure.

In certain embodiments, the treatment fluids of the present disclosure may contact one or more metal surfaces located at a wellsite where a wellbore penetrating at least a portion of a subterranean formation is located. In certain embodiments, the one or more metal surfaces may be located between a source of the aqueous fluid and a wellhead. In certain embodiments, the one or more metal surfaces may be located on a pipe (e.g., surface piping or "frac iron"), a storage tank (e.g., a frac water storage tank), a valve, a pump, or a manifold. In certain embodiments, the one or more metal surfaces may be located on equipment that is used to deliver a treatment fluid (e.g., a fracturing fluid) to the wellbore. In certain embodiments, the metal surface may include a carbon steel. In some embodiments, the metal surface may include a low alloy carbon steel. As used herein, the term "low allow carbon steel" refers to a category of ferrous metals that include alloying elements in an amount from about 2% to about 10% by weight of the metal. Examples of alloying elements that may be in the low alloy carbon steel used in the present disclosure may include, but are not limited to, nickel, chromium, molybdenum, vanadium, boron, copper, tungsten, carbon, manganese, silicon, sulfur, niobium, and any combination thereof.

The present disclosure in some embodiments provides methods for using the treatment fluids to carry out hydraulic fracturing treatments (including fracture acidizing treatments). In certain embodiments, a treatment fluid may be introduced into a subterranean formation. In some embodiments, the treatment fluid may be introduced into a wellbore that penetrates a subterranean formation. In some embodiments, the treatment fluid may be introduced at or above a pressure sufficient to create or enhance one or more fractures within the subterranean formation. In some embodiments, the treatment fluid may be introduced using one or more pumps. The treatment fluids used in these fracturing treatments may include a number of different types of fluids, including but not limited to pre-pad fluids, pad fluids, fracturing fluids, slickwater fluids, proppant-laden fluids, and the like.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, an optional proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid can be directly sourced from the fluid source 30. In certain instances, the fracturing fluid may include water, a hydrocarbon fluid, a polymer gel, foam, air, wet gases and/or other fluids.

The proppant source 40 can include a proppant for combination with the fracturing fluid. The system may also include one or more additive sources 70 that provides one or more additives (e.g., the compositions of the present disclosure, as well as other optional additives) to alter the properties of the fracturing fluid. For example, the other additives 70 can be included to reduce pumping friction, to reduce or eliminate the fluid reaction to the geological formation in which the well is formed, to operate as surfactants, and/or to serve other functions.

The pump and blender system 50 receives the fracturing fluid and combines it with other components, including optional proppant from the proppant source 40 and/or additional fluid from the additives 70. The resulting mixture may be pumped down the well 60 at or above a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some, or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
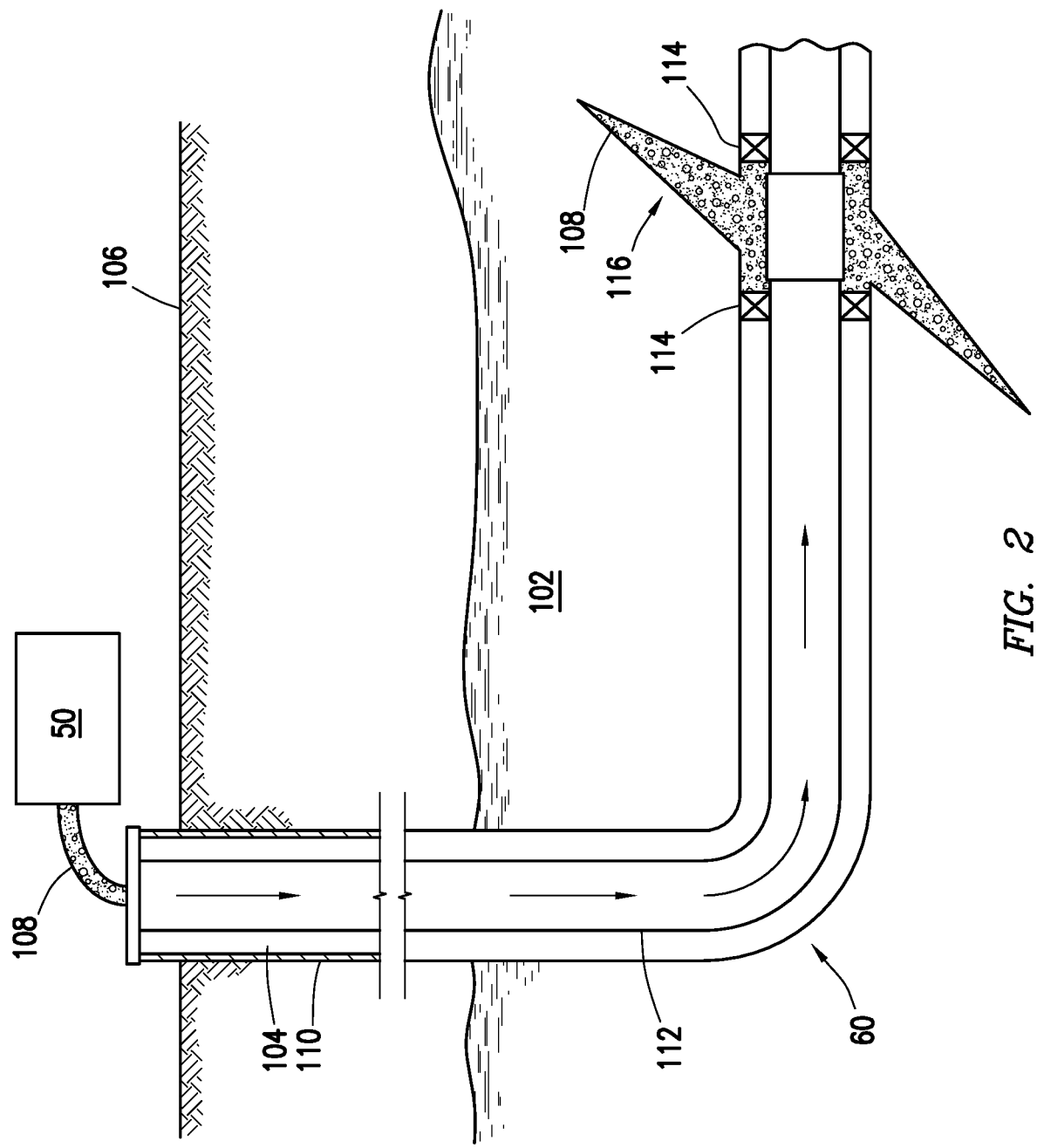
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the wellbore 104. The pump and blender system 50 is coupled with a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to directly communicate the fracturing fluid 108 into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to isolate an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. Optionally, the proppant particulates in the fracturing fluid 108 may enter the fractures 116 where they may remain after the fracturing fluid flows out of the wellbore. These proppant particulates may "prop" fractures 116 such that fluids may flow more freely through the fractures 116. In some embodiments, multiple intervals in the same wellbore/formation may be successively isolated and treated in a similar manner.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method that includes: providing a treatment fluid including an aqueous fluid and a composition that includes an oxygen scavenger, a pH-adjusting agent, and a corrosion inhibitor, wherein the aqueous fluid is aerated; contacting a metal surface with the treatment fluid; and introducing the treatment fluid into a wellbore penetrating at least a portion of a subterranean formation.

In one or more embodiments described in the preceding paragraph, the aqueous fluid includes a brine or produced water. In one or more embodiments described in the preceding paragraph, the metal surface includes a low alloy carbon steel. In one or more embodiments described in the preceding paragraph, the metal surface is located on one or more of a pipe, a storage tank, a valve, a manifold, or a pump used to deliver the treatment fluid into the wellbore. In one or more embodiments described in the preceding paragraph, the step of providing the treatment fluid includes continuously adding the composition to the aqueous fluid. In one or more embodiments described in the preceding paragraph, the treatment fluid further includes one or more additional additives. In one or more embodiments described in the preceding paragraph, further including adding one or more additional additives to the treatment fluid. In one or more embodiments described in the preceding paragraph, further including allowing the oxygen scavenger to reduce the amount of oxygen in the aqueous fluid by at least 95% within about 60 minutes. In one or more embodiments described in the preceding paragraph, further including allowing the pH-adjusting agent to increase the pH of the aqueous fluid to a level between about 7 and about 9. In one or more embodiments described in the preceding paragraph, the treatment fluid is introduced into the wellbore at or above a pressure sufficient to create or enhance one or more fractures within the subterranean formation.

An embodiment of the present disclosure is a method that includes: providing a fracturing fluid including an aqueous fluid, one or more additives, and a composition including an oxygen scavenger, a pH-adjusting agent, and a corrosion inhibitor, wherein the aqueous fluid includes dissolved oxygen gas in an amount of from about 4 ppm to about 14 ppm; contacting a metal surface with the fracturing fluid; and introducing the fracturing fluid into the wellbore at or above a pressure sufficient to create or enhance one or more fractures within the subterranean formation.

In one or more embodiments described in the preceding paragraph, the composition is present in the aqueous fluid in an amount from about 50 ppm to about 5,000 ppm by volume of the aqueous fluid. In one or more embodiments described in the preceding paragraph, the metal surface includes a low alloy carbon steel and is located on a pipe, a storage tank, a valve, a manifold, or a pump used to deliver the treatment fluid into the wellbore. In one or more embodiments described in the preceding paragraph, further including allowing the pH-adjusting agent to increase the pH of the aqueous fluid to a range from about 7 to about 9. In one or more embodiments described in the preceding paragraph, further including allowing the oxygen scavenger to reduce the amount of oxygen gas in the aqueous fluid by at least 95% within about 60 minutes. In one or more embodiments described in the preceding paragraph, the composition is added to the aqueous fluid to form the fracturing fluid, and wherein the composition is stored for up to 12 months before is it added to the aqueous fluid.

An embodiment of the present disclosure is a fracturing fluid that includes: an aqueous fluid including dissolved oxygen gas; and a composition including an oxygen scavenger, a pH-adjusting agent, and a corrosion inhibitor.

In one or more embodiments described in the preceding paragraph, further including one or more additives selected from the group consisting of: a proppant particulate, a friction reducer, a biocide, a scale inhibitor, a surfactant, and any combination thereof. In one or more embodiments described in the preceding paragraph, the aqueous fluid has an initial pH from about 6 to about 8, and wherein the pH of the aqueous fluid increases to from about 7 to about 9 within 20 minutes. In one or more embodiments described in the preceding paragraph, the aqueous fluid includes the dissolved oxygen gas in an amount from about 4 ppm to about 14 ppm.

To facilitate a better understanding of the present disclosure, the following example of certain aspects of a particular embodiment is given. The following example is not the only example that could be given according to the present disclosure and is not intended to limit the scope of the disclosure or claims.

EXAMPLE

Two aerated brine samples were prepared with a dissolved oxygen concentration of 7.62 ppm. As the experimental control, Sample #1 contained 1 liter of the prepared aerated brine and was subsequently injected with nitrogen at about a rate of 150 mL per minute after about 1 hour and 40 minutes. Similarly, Sample #2 contained 1 liter of the prepared aerated brine, but was subsequently injected with about 1,500 ppm of a composition of the present disclosure after about 1 hour and 40 minutes, the composition including 150 ppm of sodium sulfite as an oxygen scavenger, 37.5 ppm of sodium hydroxide as a pH-adjusting agent, and 7.5 ppm of a benzyl quaternary amine with $C_{12}$-$C_{16}$ carbon chain distribution as the corrosion inhibitor. The experiment was conducted in a tank apparatus consisting of a circulation pump, a dissolved oxygen meter, a pH meter, and a steel electrode.

Figure 3:
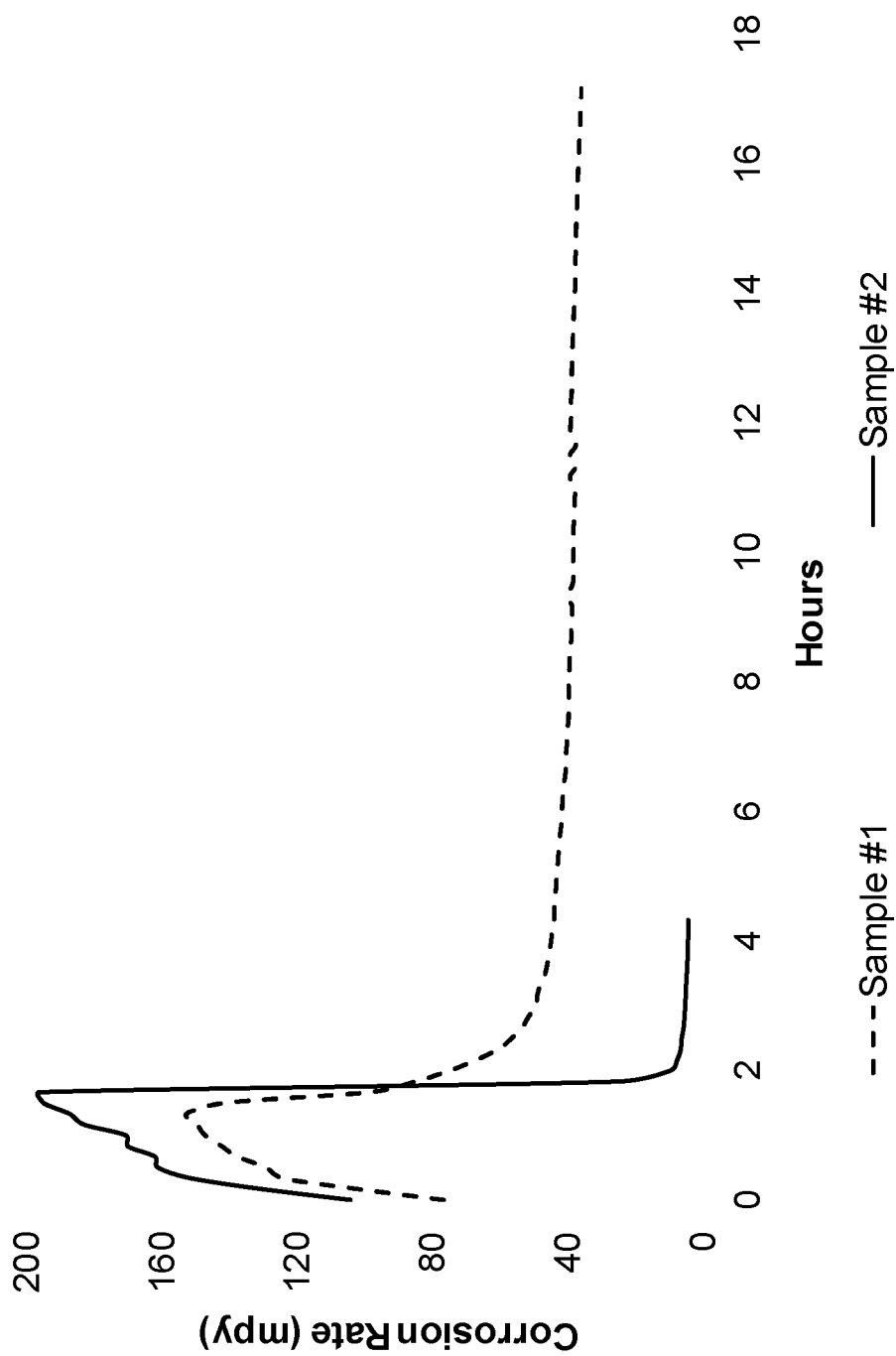
FIG. 3 is a diagram illustrating the corrosion rate of fluids over time in accordance with certain embodiments of the present disclosure.

As shown in FIG. 3, the corrosion rate of the steel electrode in each sample was measured in mils per year ("mpy") over several hours. The instantaneous corrosion rate was measured with a Gamry electrochemical measurement system using the linear polarization resistance technique. The working electrode was polarized +/−13 millivolt ("mV") from its free-corroding potential at a rate of 0.4 mV per second while the beta coefficient was set at 26 mV. The current response was measured and the polarization resistance was determined. Alternatively, the corrosion rate could be measured by quantifying the loss of mass over time. Both of these test methods, electrochemical and gravimetric, could be employed under different test conditions with respect to temperature, salinity, shear stress, oxygen saturation, additional chemical additives, acidity, and oil/water ratios.

After about 1 hour and 40 minutes, Sample #1 was injected with nitrogen while Sample #2 was injected with the composition of the present disclosure. As shown in FIG. 3 and Table 1 below, Sample #1 had a corrosion inhibition efficiency of about 68% while Sample #2 achieved a corrosion inhibition efficiency of about 97%. The corrosion inhibition efficiency was determined from the difference between the baseline corrosion rate and the inhibited corrosion rate over the baseline corrosion rate using the following equation:

$$\left(1 - \frac{\text{Inhibited Corrosion Rate}}{\text{Baseline Corrosion Rate}}\right) \times 100.$$

The baseline corrosion rates shown in Table 1 below are averages of the corrosion rates measured from about 0.5 hours to about 1 hour and 40 minutes. The inhibited corrosion rates shown in Table 1 below are averages of the corrosion rates measured from about 3 hours and 20 minutes to about 4 hours and 20 minutes. As a result, the composition of the present disclosure injected into Sample #2 provided more corrosion inhibition to the aerated brine as compared to the nitrogen injected into Sample #1.

TABLE 1

| Sample | Baseline Corrosion Rate (mpy) | Inhibited Corrosion Rate (mpy) | Corrosion Inhibition Efficiency (%) |
|---|---|---|---|
| Sample #1 | 142.80 | 45.48 | 68.15 |
| Sample #2 | 180.24 | 4.58 | 97.46 |

Dissolved oxygen and pH measurements were taken of Sample #2 after the composition of the present disclosure was added and are reported in Table 2 below. Within three minutes after injecting the composition of the present disclosure into the aerated brine, the dissolved oxygen concentration in the brine was reduced to 0.47 ppm, or a 94% reduction. The largest drop in the dissolved oxygen concentration (7.62 ppm to 1.24 ppm) coincided with a pH shift from 7.08 to 8.33 caused by the pH-adjusting agent.

TABLE 2

| Time (minutes) | Oxygen (ppm) | pH |
|---|---|---|
| 0 | 7.62 | 7.08 |
| 1 | 1.24 | 8.33 |
| 3 | 0.47 | 8.33 |
| 7 | 0.24 | 8.33 |
| 9 | 0.24 | 8.32 |
| 20 | 0.20 | 8.32 |

Thus, this Example demonstrates that the composition of the present disclosure including an oxygen scavenger, a pH-adjusting agent, and a corrosion inhibitor may reduce corrosion more effectively as compared to certain compositions including only an oxygen scavenger.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising an aqueous fluid and a composition that comprises an oxygen scavenger, a pH-adjusting agent, and a corrosion inhibitor,
wherein the aqueous fluid is aerated by being exposed to any gas,
wherein the corrosion inhibitor is a film-forming surfactant,
wherein the aqueous fluid comprises an at least one salt selected from the group consisting of: NaBr, KBr, CaCl2, CaBr2, ZnBr2, KCl, NaCl, MgCl2, SrCl2, BaCl2, NaHCO3, NaSO4, a carbonate salt, a sulfide salt, a magnesium salt, a bromide salt, a formate salt, and an acetate salt, and
wherein the treatment fluid does not comprise a phosphate salt;
contacting a metal surface with the treatment fluid; and
introducing the treatment fluid into a wellbore penetrating at least a portion of a subterranean formation.

2. The method of claim 1, wherein the aqueous fluid comprises a brine or produced water.

3. The method of claim 1, wherein the metal surface comprises a low alloy carbon steel.

4. The method of claim 1, wherein the metal surface is located on one or more of a pipe, a storage tank, a valve, a manifold, or a pump used to deliver the treatment fluid into the wellbore.

5. The method of claim 1, wherein the step of providing the treatment fluid comprises continuously adding the composition to the aqueous fluid.

6. The method of claim 1, wherein the treatment fluid further comprises one or more additional additives.

7. The method of claim 1, further comprising adding one or more additional additives to the treatment fluid.

8. The method of claim 1 further comprising allowing the oxygen scavenger to reduce an amount of oxygen in the aqueous fluid by at least 95% within about 60 minutes.

9. The method of claim 1 further comprising allowing the pH-adjusting agent to increase the pH of the aqueous fluid to a level between about 7 and about 9.

10. The method of claim 1, wherein the treatment fluid is introduced into the wellbore at or above a pressure sufficient to create or enhance one or more fractures within the subterranean formation.

11. A method comprising:
providing a fracturing fluid comprising an aqueous fluid, one or more additives, and a composition comprising an oxygen scavenger, a pH-adjusting agent, and a corrosion inhibitor,
wherein the aqueous fluid comprises dissolved oxygen gas in an amount of from about 4 ppm to about 14 ppm,
wherein the corrosion inhibitor is a film-forming surfactant,
wherein the aqueous fluid comprises an at least one salt selected from the group consisting of: NaBr, KBr, CaCl2, CaBr2, ZnBr2, KCl, NaCl, MgCl2, SrCl2, BaCl2, NaHCO3, NaSO4, a carbonate salt, a sulfide salt, a magnesium salt, a bromide salt, a formate salt, and an acetate salt, and
wherein the treatment fluid does not comprise a phosphate salt;
contacting a metal surface with the fracturing fluid; and
introducing the fracturing fluid into the wellbore at or above a pressure sufficient to create or enhance one or more fractures within the subterranean formation.

12. The method of claim 11, wherein the composition is present in the aqueous fluid in an amount from about 50 ppm to about 5,000 ppm by volume of the aqueous fluid.

13. The method of claim 11, wherein the metal surface comprises a low alloy carbon steel and is located on a pipe, a storage tank, a valve, a manifold, or a pump used to deliver the treatment fluid into the wellbore.

14. The method of claim 11 further comprising allowing the pH-adjusting agent to increase the pH of the aqueous fluid to a range from about 7 to about 9.

15. The method of claim 11 further comprising allowing the oxygen scavenger to reduce the amount of oxygen gas in the aqueous fluid by at least 95% within about 60 minutes.

16. The method of claim 11, wherein the composition is added to the aqueous fluid to form the fracturing fluid, and wherein the composition is stored for up to 12 months before is it added to the aqueous fluid.

* * * * *